(12) United States Patent
Mizon et al.

(10) Patent No.: US 7,004,874 B2
(45) Date of Patent: Feb. 28, 2006

(54) ON-DEMAND POWER TAKE-OFF UNIT FOR FOUR-WHEEL DRIVE VEHICLE

(75) Inventors: Richard Mizon, Fayetteville, NY (US); Dale L. Pennycuff, Shelby Township, MI (US)

(73) Assignee: Magna Powertrain, Inc., Troy, MI (US)

(*) Notice: Subject to any disclaimer, the term of this patent is extended or adjusted under 35 U.S.C. 154(b) by 95 days.

(21) Appl. No.: 10/800,468

(22) Filed: Mar. 15, 2004

(65) Prior Publication Data

US 2005/0202918 A1 Sep. 15, 2005

(51) Int. Cl.
F16H 37/08 (2006.01)
F16H 3/44 (2006.01)
F16D 41/06 (2006.01)

(52) U.S. Cl. ............... 475/198; 475/204; 475/206; 475/295; 475/318; 192/38

(58) Field of Classification Search ........... 475/198, 475/204, 206, 223, 295, 318, 320, 332; 74/665 T; 192/38, 44, 47, 48.2, 84.6; 180/247, 248, 180/249, 251

See application file for complete search history.

(56) References Cited

U.S. PATENT DOCUMENTS

| | | | |
|---|---|---|---|
| 4,098,379 A | 7/1978 | Fogelberg et al. |
| 4,770,280 A | 9/1988 | Frost |
| 4,874,056 A | 10/1989 | Naito |
| 5,078,660 A | 1/1992 | Williams et al. |
| 5,284,068 A | 2/1994 | Frost |
| 5,323,871 A | 6/1994 | Wilson et al. |
| 5,346,442 A | 9/1994 | Eastman |
| 5,363,938 A | 11/1994 | Wilson et al. |
| 5,407,024 A | 4/1995 | Watson et al. |
| 5,411,447 A | 5/1995 | Frost |
| 5,582,263 A | 12/1996 | Varma et al. |
| 5,651,749 A | 7/1997 | Wilson et al. |
| 5,655,986 A | 8/1997 | Wilson et al. |
| 5,697,861 A | 12/1997 | Wilson |
| 5,700,222 A | 12/1997 | Bowen |
| 5,702,321 A | 12/1997 | Bakowski et al. |
| 5,704,863 A | 1/1998 | Zalewski et al. |
| 5,704,867 A | 1/1998 | Bowen |
| 5,836,847 A | 11/1998 | Pritchard |
| 5,884,526 A | 3/1999 | Fogelberg |
| 5,902,205 A | 5/1999 | Williams |
| 5,924,510 A | 7/1999 | Itoh et al. |
| 5,947,858 A | 9/1999 | Williams |
| 5,951,428 A | 9/1999 | Itoh et al. |
| 5,951,429 A | 9/1999 | Eastman |
| 5,992,592 A | 11/1999 | Showalter |
| 5,993,592 A | 11/1999 | Perego |

(Continued)

FOREIGN PATENT DOCUMENTS

EP 1253041 A2 * 10/2002

Primary Examiner—Roger Pang
Assistant Examiner—David D. Le
(74) Attorney, Agent, or Firm—Harness, Dickey & Pierce P.L.C.

(57) ABSTRACT

An on-demand power take-off unit is equipped with a dual-mode bi-directional overrunning clutch and a shift mechanism to establish on-demand and part-time four-wheel drive modes. Further, the power take-off unit includes a disconnect clutch that is controlled by the mode shift mechanism to establish a two-wheel drive mode in addition to the four-wheel drive modes.

17 Claims, 9 Drawing Sheets

U.S. PATENT DOCUMENTS

| | | |
|---|---|---|
| 6,022,289 A | 2/2000 | Francis |
| 6,056,666 A | 5/2000 | Williams |
| 6,062,361 A | 5/2000 | Showalter |
| 6,079,535 A | 6/2000 | Mueller et al. |
| 6,092,635 A | 7/2000 | McCarthy et al. |
| 6,113,512 A | 9/2000 | Williams |
| 6,123,183 A | 9/2000 | Ito et al. |
| 6,132,332 A | 10/2000 | Yasui |
| 6,152,848 A | 11/2000 | Williams et al. |
| 6,283,887 B1 | 9/2001 | Brown et al. |
| 6,409,000 B1 | 6/2002 | Itoh et al. |
| 6,409,001 B1 | 6/2002 | Kerr |
| 6,513,615 B1 | 2/2003 | Bowen et al. |
| 6,578,654 B1 | 6/2003 | Porter |
| 6,578,692 B1 | 6/2003 | Porter |
| 6,579,203 B1 | 6/2003 | Wang et al. |
| 6,579,205 B1 * | 6/2003 | Williams .................... 475/204 |
| 6,602,159 B1 | 8/2003 | Williams |
| 6,629,474 B1 | 10/2003 | Williams |
| 6,652,407 B1 | 11/2003 | Ronk et al. |
| 2002/0159890 A1 | 10/2002 | Williams |
| 2004/0220010 A1 * | 11/2004 | Williams .................... 475/198 |

* cited by examiner

ON-DEMAND POWER TAKE-OFF UNIT FOR FOUR-WHEEL DRIVE VEHICLE

FIELD OF THE INVENTION

The present invention relates generally to all-wheel drive motor vehicles, and more particularly, to a power take-off unit having an actively-controlled, multi-mode bi-directional overrunning clutch assembly.

BACKGROUND OF THE INVENTION

Four-wheel drive vehicles are in great demand due to the enhanced on and off road traction control they provide. In many four-wheel drive vehicles, a transfer case is installed in the drivetrain and is normally operable to deliver drive torque to the primary driveline for establishing a two-wheel drive mode. The transfer case is further equipped with a clutch assembly that can be selectively or automatically actuated to transfer drive torque to the secondary driveline for establishing a four-wheel drive mode. These "mode" clutch assemblies can range from a simple dog clutch that is operable for mechanically shifting between the two-wheel drive mode and a "locked" (i.e., part-time) four-wheel drive mode to a more sophisticated automatically-actuated multi-plate clutch for providing an "on-demand" four-wheel drive mode.

On-demand four-wheel drive systems are able to provide enhanced traction and stability control and improved operator convenience since the drive torque is transferred to the secondary driveline automatically in response to lost traction of the primary driveline. An example of passively-controlled on-demand transfer case is shown in U.S. Pat. No. 5,704,863 where the amount of drive torque transferred through a pump-actuated clutch pack is regulated as a function of the interaxle speed differential. In contrast, actively-controlled on-demand transfer cases include a clutch actuator that is adaptively controlled by an electronic control unit in response to instantaneous vehicular operating characteristics detected by a plurality of vehicle sensors. U.S. Pat. Nos. 4,874,056, 5,363,938 and 5,407,024 disclose various examples of adaptive on-demand four-wheel drive systems.

Due to the cost and complexity associated with such actively-controlled on-demand clutch control systems, recent efforts have been directed to the use of overrunning clutches that can be controlled to provide various operating modes. For example, U.S. Pat. No. 5,993,592 illustrates a pawl-type controllable overrunning clutch assembly installed in a transfer case and which can be shifted between various drive modes. U.S. Pat. No. 6,092,635 discloses a hydraulically-actuated multi-function controllable overrunning clutch assembly that is noted to be operable for use in vehicular power transmission mechanisms. Likewise, U.S. Pat. Nos. 5,924,510, 5,951,428, 6,123,183, and 6,132,332 each disclose a controllable multi-mode overrunning clutch installed in a transfer case and which is actuated using an electromagnetic clutch.

In recent years, there has also been a significant increase in the demand for front-wheel drive motor vehicles equipped with a powertrain capable of providing drive torque to all four wheels. To provide drive torque to the rear wheels in front-wheel drive vehicles, a power transmission assembly, commonly referred to as a power take-off unit (PTU), is driven by the output of a multi-speed transaxle and supplies power through a transfer clutch to the rear driveline. Typically, all-wheel drive arrangements deliver drive torque automatically (i.e., on-demand) through the transfer clutch to the rear driveline in response to lost traction at the front wheels. Recently, a great deal of development effort has been directed to packaging the PTU and the related rear driveline components within the underbody of conventional front-wheel drive vehicles. Thus, a need exists to develop new PTU arrangements which are compact in size, can be packaged into existing front-wheel drive vehicles, and provide features that enhance performance.

SUMMARY OF THE INVENTION

It is therefore an objective of the present invention to provide an all-wheel drive power transfer system for a motor vehicle equipped with a transversely-mounted engine and transmission assembly.

As a related objective of the present invention, the all-wheel drive power transfer system includes a power take-off unit having a first drive mechanism connected to the rear wheels and a second drive mechanism connected to the front wheels. The first drive mechanism includes a bevel gearset which delivers power to a rear driveline for driving the rear wheels. The second drive mechanism includes a planetary reduction unit which drives a front differential unit that is interconnected to a pair of front axleshafts for driving the front wheel.

In addition, the power take-off unit of the present invention includes a mode clutch that is operable to control the transfer of drive torque from the first drive mechanism to the second drive mechanism.

Thus, it is an additional objective of the present invention to provide a power take-off unit equipped with a controllable, multi-mode, bi-directional overrunning mode clutch assembly that advances the state of the all-wheel drive technology.

It is a further objective of the present invention to provide a power-operated clutch actuator for controlling actuation of the mode clutch assembly in response to mode signals received by a control system.

Accordingly, the present invention is directed to a controllable, multi-mode, bi-directional overrunning clutch assembly and a mode shift mechanism adapted for use in a power take-off unit for transferring drive torque from the first drive mechanism to the second drive mechanism so as to establish a four-wheel drive mode. The mode clutch assembly includes a first ring driven by the first drive mechanism, a second ring, and a plurality of rollers disposed in opposed cam tracks formed between the first and second rings. The second ring is split to define an actuation channel having a pair of spaced end segments. An actuator ring is moveable between positions engaged with and released from the end segments of the second ring. The mode shift mechanism controls movement of the actuator ring for establishing an on-demand four-wheel drive mode and a locked four-wheel drive mode.

The present invention is also directed to providing the power take-off unit with a disconnect clutch assembly which can be selectively actuated for establishing a two-wheel drive mode in addition to the on-demand and locked four-wheel drive modes. In addition, the mode shift mechanism permits coordinated actuation of the mode clutch assembly and the disconnect clutch assembly using a single power-operated actuator.

The present invention is further directed to a full-time version of the power take-off unit with the mode clutch assembly operably disposed between front and rear outputs of a center differential so as to establish an automatic all-wheel drive mode and a locked four-wheel drive mode.

These and other objects, advantages and features of the present invention will the art from studying the following detailed description and the drawings which, while disclosing the invention in the best mode currently known for carrying out the invention, are not intended to be limiting but rather exemplary of one application currently contemplated.

DETAILED DESCRIPTION OF THE PREFERRED EMBODIMENTS

The present invention is generally directed to a power take-off unit for use in an all-wheel drive vehicle equipped with a transversely mounted engine and a multi-speed transmission and which is arranged to provide an on-demand four-wheel drive mode of operation.

Figure 1:
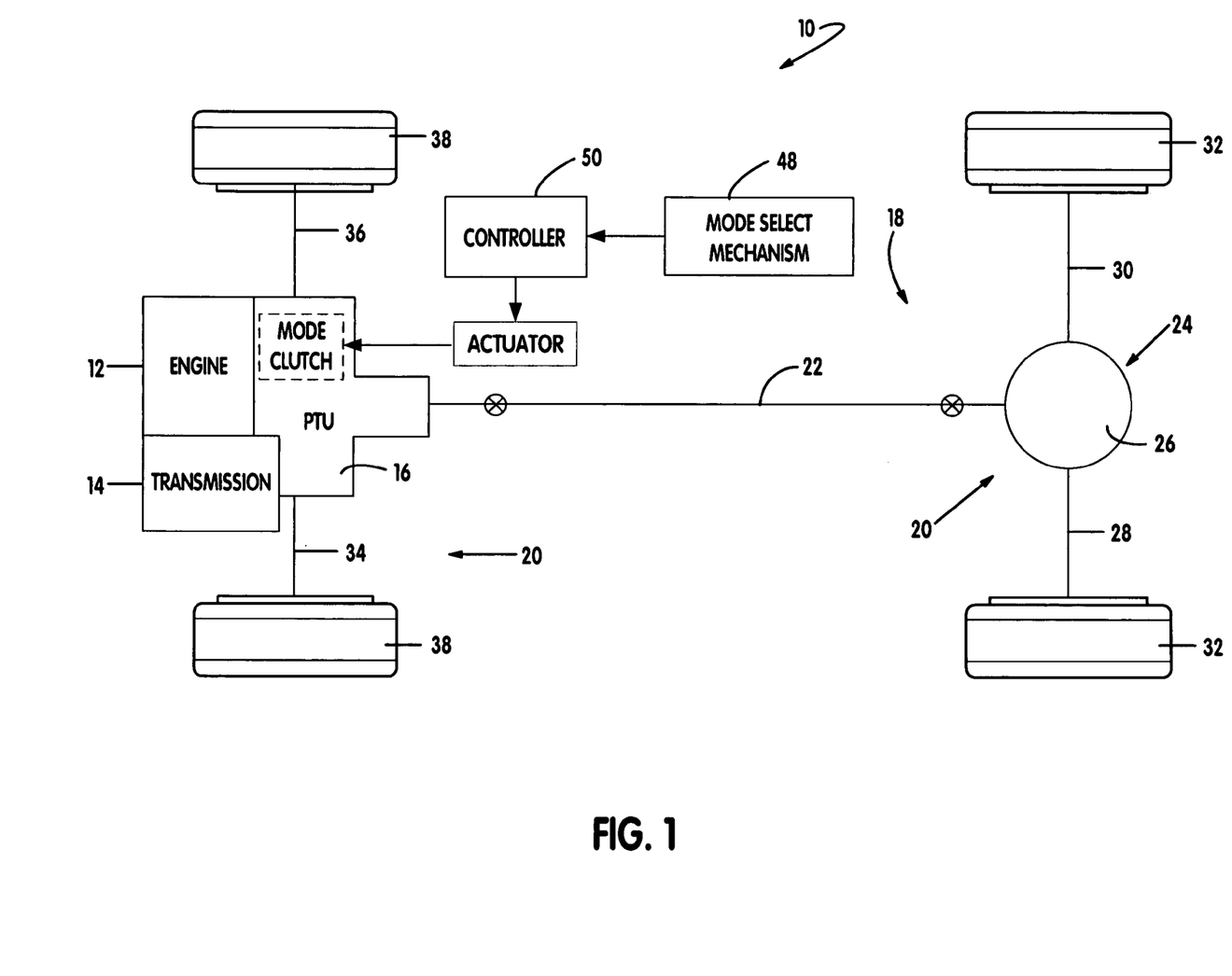
FIG. 1 is a schematic illustration of an all-wheel drive vehicle equipped with a power transfer system according to the present invention.

Referring to FIG. 1, a schematic illustration of a drivetrain for an all-wheel drive motor vehicle is shown interactively associated with a power transfer system 10. The drivetrain includes a transversely mounted engine 12 and a multi-speed transmission 14 adapted to deliver motive power (i.e., drive torque) to the input of a power transfer assembly, hereinafter referred to as power take-off unit (PTU) 16. PTU 16 is normally operable to deliver drive torque to a first driveline 18 and works in conjunction with power transfer system 10 to selectively transfer drive torque to a second driveline 20. First driveline 18 includes a drive shaft 22 and an axle assembly 24. One end of drive shaft 22 is connected to an output member of PTU 16 and its opposite end is connected to a differential 26 associated with axle assembly 24. Axle assembly 24 further includes a pair of axleshafts 28 and 30 which connect a pair of ground-engaging wheels 32 to differential 26. Likewise, second driveline 20 includes a pair of axleshafts 34 and 36 connected to a pair of ground-engaging wheels 38.

As will be detailed hereinafter with greater specificity, PTU 16 includes a first drive mechanism 40, a second drive mechanism 42 and a mode clutch 44 for selectively transferring drive torque from first drive mechanism 40 to second drive mechanism 42. In the particular arrangement shown, first drive mechanism 40 and first driveline 18 are arranged to deliver drive torque to rear wheels 32 while second drive mechanism 42 and second driveline 20 are arranged to deliver drive torque to front wheels 38. Power transfer system 10 further includes a power-operated clutch actuator 46 for controlling actuation of mode clutch 44, a mode select mechanism 48 operable to permit the vehicle operator to select one of the available drive modes, and a controller 50 for controlling actuation of clutch actuator 46 in response to the mode signal sent to controller 50 from mode select mechanism 48.

Referring primarily to FIGS. 2 through 6, PTU 16 is shown to include a multi-piece casing 60 within which the various sub-assemblies and components are located. PTU 16 includes an input shaft 62 rotatably supported by a pair of bearing assemblies 64 and which is adapted to be driven by the output of transmission 14. First drive mechanism 40 is shown to include a right-angled drive assembly having a ring gear 66 fixed for rotation with input shaft 62 and which is meshed with a pinion gear 68 on a pinion shaft 70 that is coupled to rear drive shaft 28. As seen, ring gear 66 is secured via bolts 72 to a radial flange segment 74 of input shaft 62 while pinion shaft 70 is rotatably supported in casing 60 via a pair of bearing assemblies 76. Pinion shaft 70 includes a mounting yoke 78 to accommodate its connection to drive shaft 22. In accordance with this arrangement, drive torque is transferred from transmission 14 to drive shaft 22 through input shaft 62, ring gear 66, pinion gear 68 and pinion shaft 70.

Figure 2:
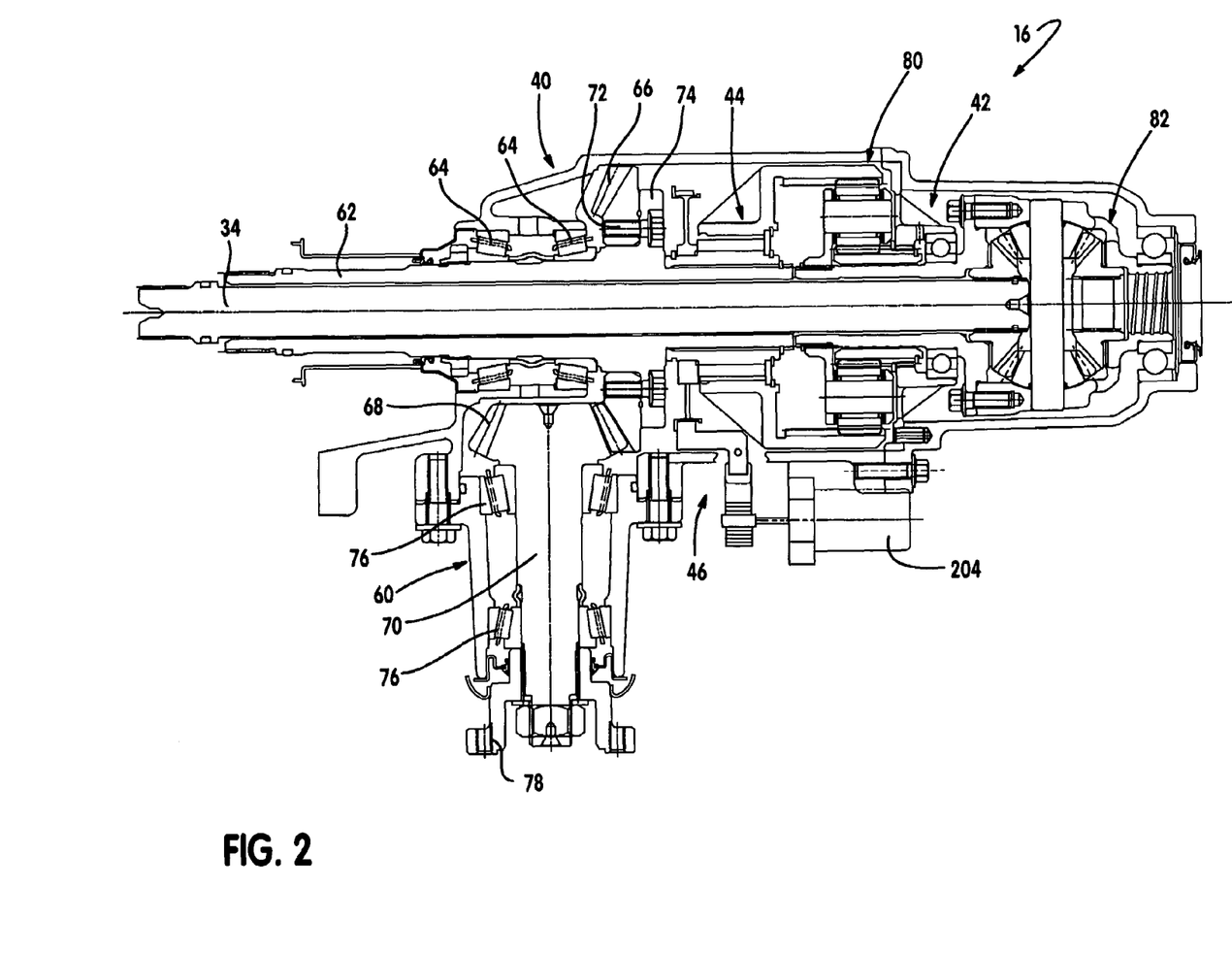
FIG. 2 is a sectional view of a power take-off unit according to a preferred embodiment of the present invention.
Figure 3:
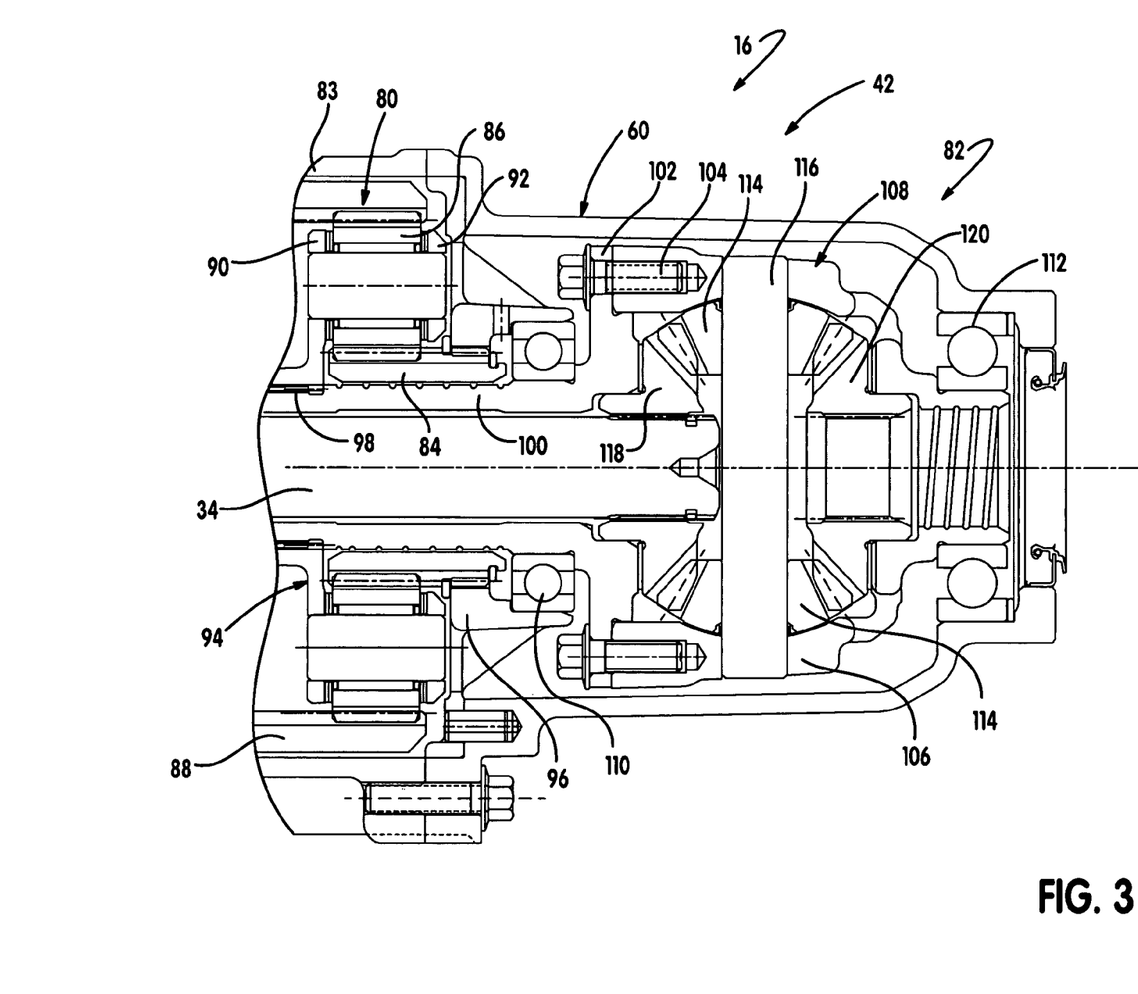
FIG. 3 is an enlarged partial sectional view taken from FIG. 2 showing the components of the front final drive unit and front differential.

Second drive mechanism 42 includes a reduction drive unit 80 and a front differential unit 82. Reduction drive unit 80 is provided in PTU 16 to match the front driveline ratio with the rear driveline ratio. Reduction drive unit 80 is a planetary gearset having a ring gear 83, a sun gear 84, and a plurality of planet gears 86. Planet gears 86 are rotatably supported on pinion posts 88 extending between first and second carrier rings 90 and 92, respectively so as to define a planet carrier 94. Sun gear 84 is fixed (i.e., splined) to a brake ring 96 that is rigidly fixed to casing 60 so as to be prevent sun gear 84 from rotating. As seen, first carrier ring 90 is fixed via a spline connection 98 to a tubular hub segment 100 of a first carrier housing 102. First carrier housing 102 is secured via bolts 104 to a second carrier housing 106 so as to define a differential carrier 108. Thus, planet carrier 94 of reduction unit 80 directly drives differential carrier 108 which functions as the input member of front differential unit 82. Bearing assemblies 110 and 112 are shown to rotatively support differential carrier 108 within casing 60. Differential unit 82 also includes pinions 114 that are rotatably supported on a pinion shaft 116 fixed to second carrier housing 106 and first and second side gears 118 and 120 meshed therewith. First side gear 118 is fixed (i.e., splined) to front axleshaft 34 while second side gear 120 is fixed (i.e., splined) to front axleshaft 36. In accordance with the present invention, mode clutch 44 is operable to releaseably couple ring gear 83 for rotation with input shaft 62 so as to transfer drive torque to front drive mechanism 42.

Figure 4:
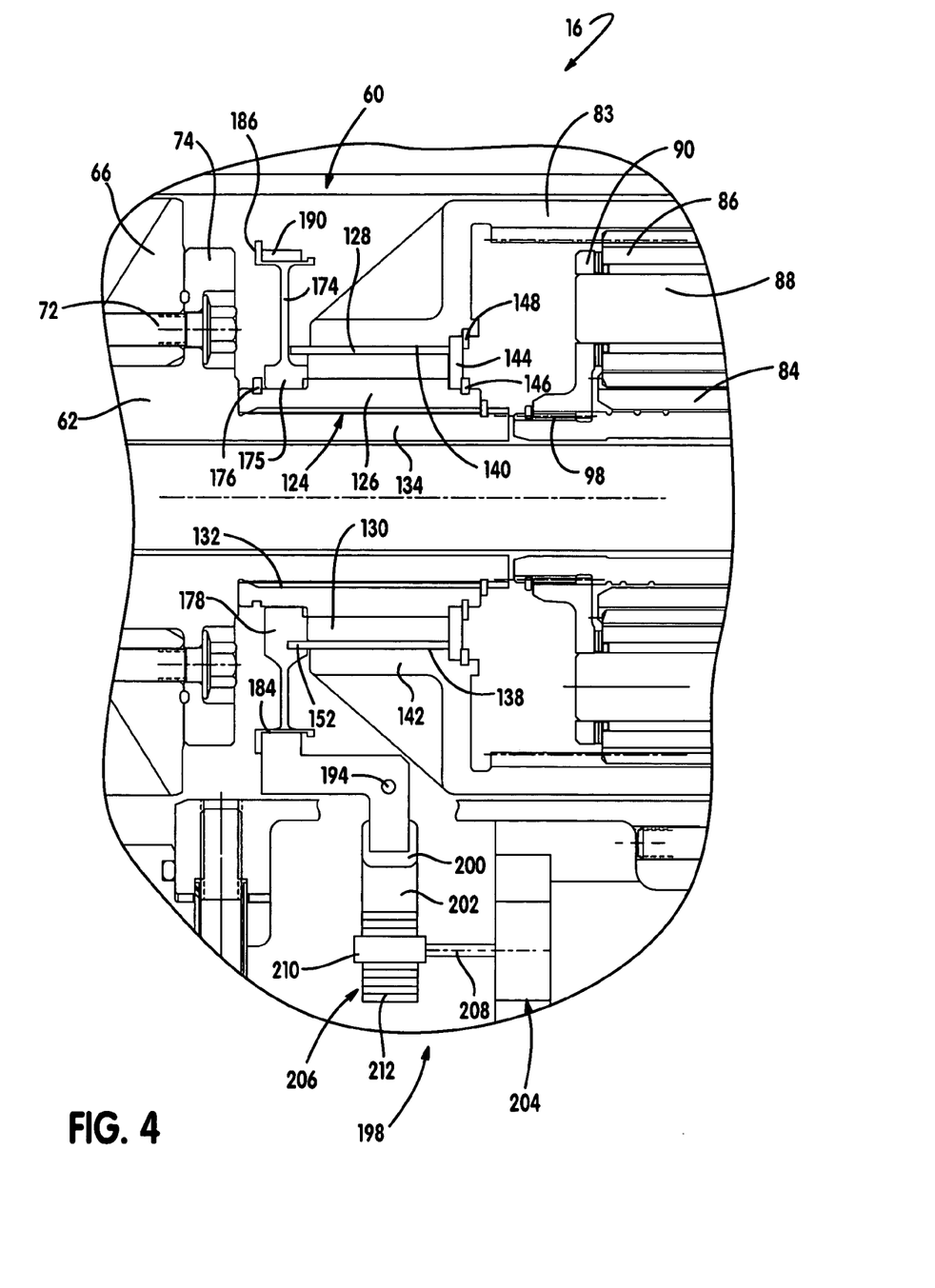
FIG. 4 is an enlarged partial sectional view taken from FIG. 2 showing the components associated with the multi-mode bi-directional overrunning mode clutch assembly and mode shift mechanism in greater detail.
Figure 5:
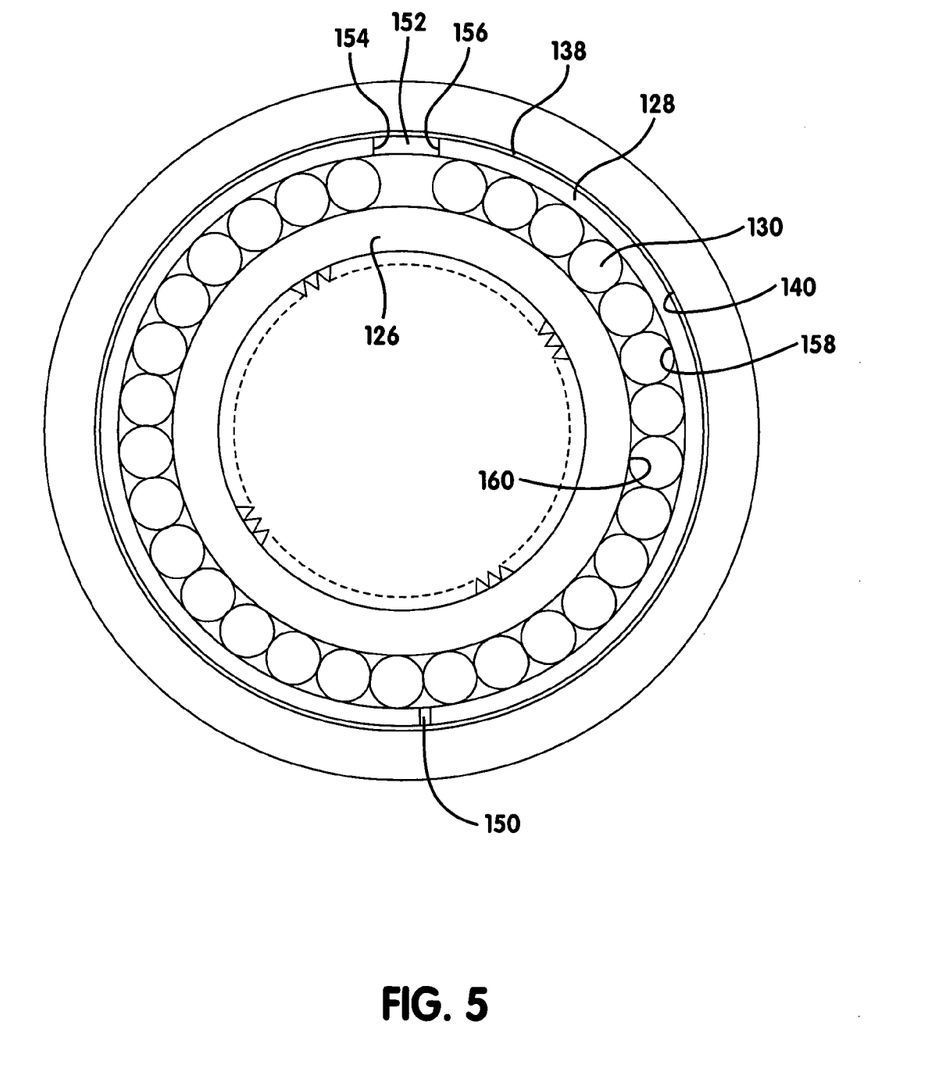
FIG. 5 is an end view of the bi-directional mode clutch assembly.

As best seen from FIGS. 4 and 5, mode clutch 44 is a controllable, multi-mode, bi-directional overrunning clutch assembly 124 that is operably installed between ring gear 83 and input shaft 62. In general, mode clutch assembly 124 includes a first ring 126, a second ring 128, and a plurality of cylindrical rollers 130. First ring 126 is fixed via a spline connection 132 to a tubular stub shaft segment 134 of input shaft 62 for common rotation therewith. A lock ring 136 axially restrains first ring 126 on shaft segment 134 against radial flange segment 74. Second ring, hereinafter referred to as slipper ring 128, has an outer cylindrical surface 138 concentrically aligned in close proximity to an inner cylindrical surface 140 of an annular hub segment 142 of ring gear 83. A retainer ring 144 is located between first ring 126 and annular hub segment 142 and is retained therebetween via inner and outer snap rings 146 and 148, respectively. Retainer ring 144 functions to retain slipper ring 128 and rollers 130 against axial travel in a direction toward planetary reduction unit 80.

Slipper ring 128 is a split ring having an axially extending slit 150 and an actuation slot 152 defining first and second end surfaces 154 and 156, respectively. A series of cam tracks 158 are formed on the inner surface of slipper ring 128 while a corresponding number of cam tracks 160 are formed in the outer surface of first ring 126. The cam tracks are preferably arcuate but can have any alternative (i.e., ramp-type) surface configuration suitable for bi-directional locking of mode clutch assembly 124. Rollers 130 are located and retained between the aligned sets of cam tracks 158 and 160. Mode clutch assembly 124 further includes an actuator ring 174 that is journalled on first ring 126 and has a hub segment 175 retained against rollers 130 via a lock ring 176 for preventing axial travel of rollers 130. Hub segment 175 on actuator ring 174 also includes a lug segment 178 that is retained within actuation slot 152 of slipper ring 128. In addition, actuator ring 174 includes a cylindrical rim 184 having an upstanding flange 186 to define a circumferential retention groove.

Overrunning clutch assembly 124 further includes a drag band 190 which encircles and engages rim 184 on actuator ring 174 and which is retained within the retention groove. As best seen from FIGS. 6A and 6B, drag band 190 has a pair of ends 192 interconnected by a roll pin 194 and biased by a compression-type coil spring 196 to maintain a predetermined drag force on rim segment 184 of actuator ring 174. Drag band 190 is preferably made of brass or a suitable spring material.

Figure 6A:
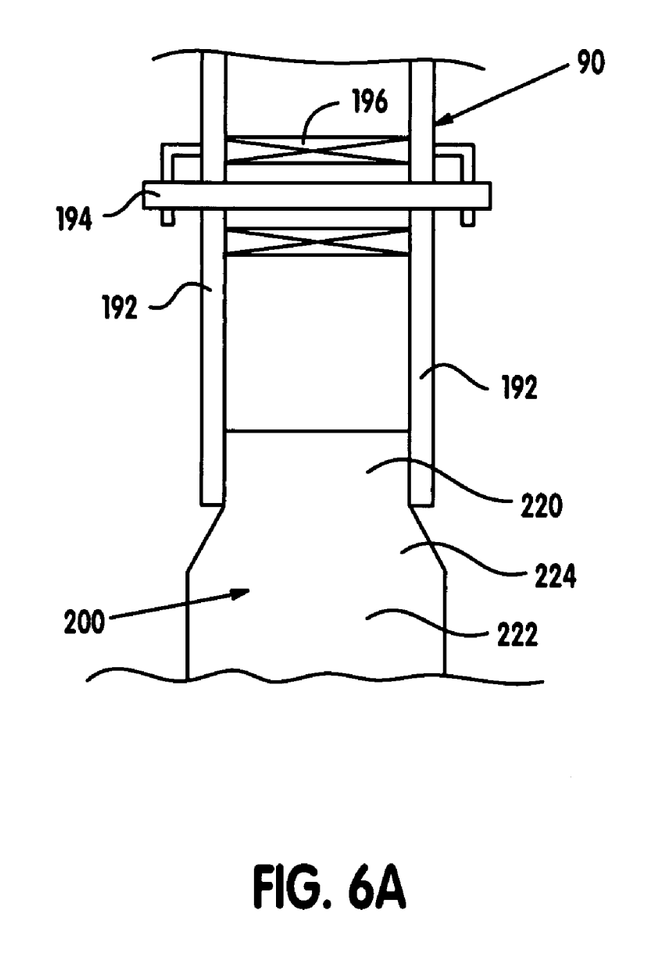
FIGS. 6A and 6B are partial end views of the drag band and actuator block associated with the mode shift mechanism.
Figure 6B:
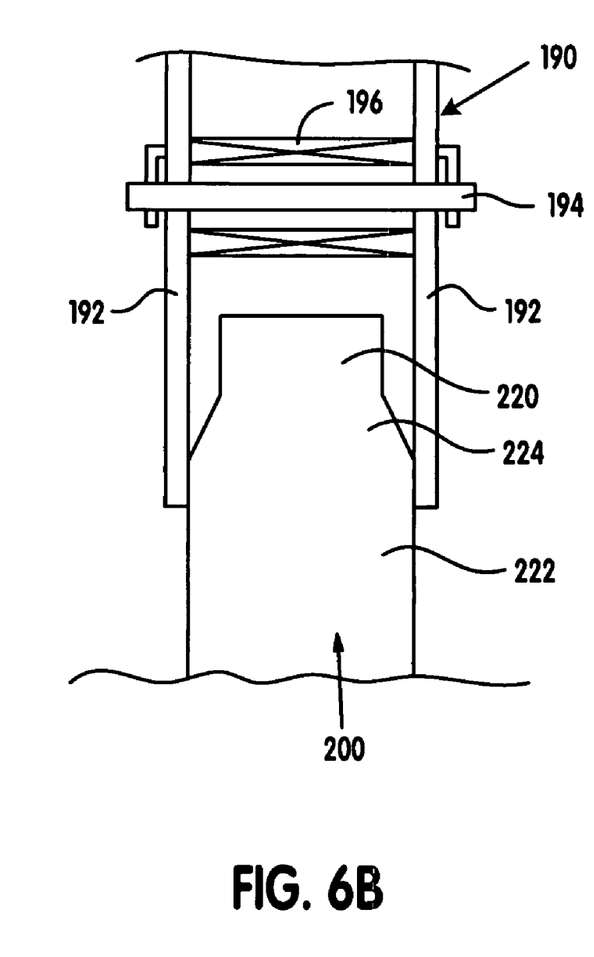

Mode clutch 44 further includes a mode shift mechanism 198 having an actuator block 200 secured to one end of a moveable shift member 202. As seen in FIGS. 6A and 6B, actuator block 200 is disposed between, and its side surfaces engage, both ends 192 of drag band 190. In addition, spring 196 is arranged to urge band ends 192 into continuous contact with actuator block 200. As will be detailed, the tapered contour of actuator block 200 functions to cause ends 192 of drag band 190 to move between a retracted position (FIG. 6A) and an expanded position (FIG. 6B) in response to corresponding translational movement of actuator block 200 between first and second positions relative to drag band 190.

Preferably, actuator 46 includes a power-operated device, such as an electric motor 204, which is operable for moving shift member 202 in response to electrical control signals applied thereto by controller 50. To provide means for controlling movement of actuator block 200, actuator 46 also includes a drive mechanism 206. Drive mechanism 206 is interconnected to a rotary output member 208 of motor 204 for changing its output torque into axially-directed forces that are used for controlling bi-directional translational movement of shift member 202. According to a preferred construction, drive mechanism 206 includes drive pinion 210 fixed to motor output shaft 208 which is meshed with a rack of teeth 212 on shift member 202.

According to a preferred embodiment of the present invention, shift member 202 is moveable between two distinct mode positions to establish corresponding drive modes. These drive modes include a locked four-wheel mode and an on-demand four-wheel drive mode. When it is desired to establish the on-demand four-wheel drive mode, shift member 202 is moved to a first or AUTO mode position which causes corresponding movement of actuator block 200 to its first position for locating ends 192 of drag band 190 in their retracted position (FIG. 6A). In contrast, PTU 16 is operable in the locked four-wheel drive mode when shift member 202 is moved to a second or LOCK mode position which, in turn, locates actuator block 200 in its second position for forcibly moving ends 192 of drag band 190 to their extended position (FIG. 6B). In operation, the vehicle operator selects the desired four-wheel drive mode via actuation of mode select mechanism 48 which, in turn, sends a mode signal to controller 50 that is indicative of the selection. Thereafter, controller 50 generates an electric control signal that is applied to motor 204 for rotating pinion 210 to move shift member 202. It will be understood that a two-position linear actuator capable of translating shift member 208 between its two distinct positions could be used in place of the motor and gear drive system described.

Mode select mechanism 48 can take the form of any mode selector device which is under the control of the vehicle operator for generating a mode signal indicative of the specific mode selected. In one form, the mode selector device may be in an array of dash-mounted push button switches. Alternatively, the mode selector may be a manually-operable shift lever sequentially moveable between a plurality of positions corresponding to the available operational modes which, in conjunction with a suitable electrical switch arrangement, generates a mode signal indicating the selected mode. In either form, mode select mechanism 48 offers the vehicle operator the option of deliberately choosing between the various operative drive modes.

As noted, with shift member 202 located in its LOCK position, actuator block 200 is positioned in its second position such that ends 192 of drag band 190 are forcibly separated. As seen, actuator block 200 has a first cam segment 220 and a second cam segment 222 interconnected by a tapered intermediate segment 224. Such forced separation of ends 192 of drag band 190 is caused by their engagement with second cam segment 222 of actuator block 200 and acts to release the circumferential drag force normally exerted on actuator ring 174. With drag band 190 released from frictional engagement with rim 184 of actuator ring 174, radial lug 178 is positioned centrally in actuation slot 152 of slipper ring 128. When centrally located, the opposite edges of lug 178 are displaced from engagement with end segments 154 and 156 of actuation slot 152. As such, relative rotation between input shaft 62 and ring gear 83 in either direction (i.e., front overrunning rear or rear overrunning front) causes a limited amount of relative rotation between slipper ring 128 and first ring 126. This limited relative movement causes rollers 130 to ride up the circumferentially indexed cam tracks 158 and 160 which, in turn, causes rollers 130 to exert a radially outwardly-directed clamping force on slipper ring 128. This clamping force causes outer surface 138 of slipper ring 128 to frictionally engage inner surface 140 on hub 142 of ring gear 83. Accordingly, mode clutch assembly 124 is locked and ring gear 83 is coupled to input shaft 62 for establishing the locked four-wheel drive mode. As such, drive torque is also transferred from input shaft 62 to front wheels 38 through reduction unit 80 and differential unit 82.

Referring to FIG. 6A, actuator block 200 is shown positioned in its first position so as to establish the on-demand four-wheel drive mode due to movement of shift member 202 into its AUTO position. Specifically, actuator block 200 is positioned such that ends 192 of drag band 190 now engage side surfaces of first cam segment 220 for contracting the distance between ends 192 of drag band 190 so as to re-engage the circumferential drag force exerted by drag band 190 on rim 184 of actuator ring 174. Therefore, initial rotation of input shaft 62 and ring gear 83 caused by motive operation of the vehicle results in circumferential indexing of actuator ring 174 relative to inner ring 126 until lug 178 engages one of end surfaces 154 and 156 of actuation slot 152 in slipper ring 128.

For example, if the vehicle is rolling forward, input shaft 62 would rotate counter clockwise and the drag exerted by drag band 190 would cause actuator ring 174 to index in a clockwise direction such that lug 178 engages end surface 154 of slot 152. In this position, lug 178 prevents rotation of slipper ring 128 in a first direction (i.e., counter-clockwise) relative to inner ring 126 while permitting limited rotation of slipper ring 128 in a second direction (i.e., clockwise) relative to inner ring 126. Since inner ring 126 is driven by input shaft 62, and slipper ring 128 is mounted in hub 142, clutch assembly 124 is maintained in an unlocked condition during relative rotation in the first direction and automatically shifts into a locked condition in response to relative rotation in the second direction. Specifically, with lug 178 located adjacent end surface 154 of slot 152 it maintains central alignment between slipper ring 128 and inner ring 126 which acts to maintain rollers 130 centrally located in cam tracks 158 and 160. As such, slipper ring 128 is not expanded nor frictionally clamped to lug 142, thereby allowing ring gear 83 to overrun input shaft 62, such as during a turn. In this situation, all drive torque is delivered through first drive mechanism 40 to rear driveline 18. However, if traction is lost at rear wheels 32 and input shaft 62 attempts to overrun ring gear 83, slipper ring 128 moves in the second direction relative to inner ring 126. This limited relative rotation causes rollers 130 to ride up cam surfaces 158 and 160 and frictionally clamp slipper ring 128 to hub 142, thereby locking clutch assembly 124. This one-way locking function establishes the on-demand four-wheel drive mode during forward motion of the vehicle. Accordingly, input shaft 62 transmits drive torque through first drive mechanism 40 to rear driveline 18 and through second drive mechanism 42 to front driveline 20. The term "on-demand" refers to instantaneous locking of clutch assembly 124 in the event of a rear driveline slip condition without any input from the vehicle operator. Once the lost traction condition has been eliminated, clutch assembly 124 is self-releasing and returns to operation in its unlocked mode.

During reverse operation of the vehicle, ring gear 83 would rotate clockwise and the drag force would cause actuator ring 174 to circumferentially index until lug 178 is located adjacent to end surface 156 of slipper ring 128. This arrangement is the reverse of that described for forward operation such that limited relative rotation is permitted between slipper ring 128 and inner ring 126 in the first direction of relative rotation but is prevented in the second direction. This reverse on-demand four-wheel drive mode also permits ring gear 83 to overrun input shaft 62 during tight cornering while clutch assembly 126 locks to limit interaxle slip during lost traction at rear wheels 32. As such, once the on-demand four-wheel drive mode is established, it is operational during both forward and reverse travel of the vehicle.

Figure 7:
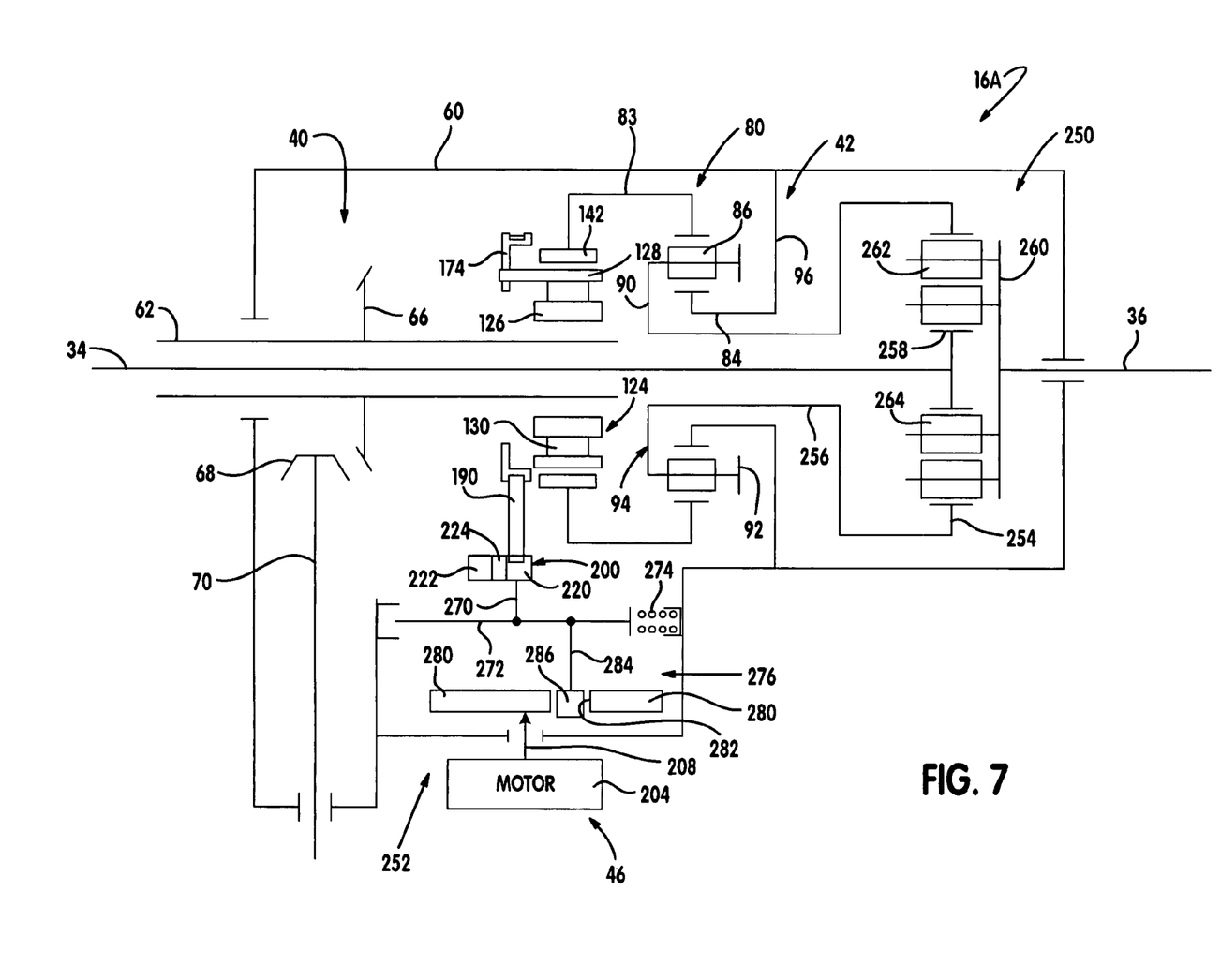
FIG. 7 through 9 are schematic illustrations of alternative constructions for the power take-off unit of the present invention.

Referring now to FIG. 7, a PTU 16A which is a modified version of PTU 16 is schematically shown. Due to the commonality of many components, the same reference numerals are used to identify those components of PTU 16A that are similar to those previously described for PTU 16. In general, PTU 16A includes a planetary-type front differential 250 and a modified mode shift mechanism 252. In particular, second drive mechanism 42 now includes reduction unit 80 and front differential unit 250 which has an annulus gear 254 that is coupled via a transfer shaft 256 to carrier ring 90 of planet carrier 94. Front differential unit 250 also includes a sun gear 258 fixed to front axleshaft 34, a pinion carrier 260 fixed to front axleshaft 36, and a dual pinion arrangement. The dual pinion arrangement includes a set of first pinions 262 rotatably supported by pinion carrier 260 that are meshed with annulus gear 254 and a set of second pinions 264 also rotatably supported by pinion carrier 260 and which are each meshed with one of first pinions 262 and sun gear 258.

Mode shift mechanism 252 is arranged to control movement of actuator block 200 between its first and second positions in response to bi-directional translational movement of a shift member 270 between its LOCK and AUTO mode positions. As seen, shift member 270 connects actuator block 200 to a shift rail 272 that is supported for sliding movement in housing 60. A spring 274 biases shift rail 272 so as to provide a fail-safe for locating shift member 270 in its AUTO position and actuator block 200 in its first position. A drive mechanism 276 is provided for converting rotary movement of motor output 208 into translational movement of shift member 270. Drive mechanism 276 includes a cam plate 280 connected to motor shaft 208 and having a contoured cam slot 282. A follower member 284 is fixed to shift rail 272 and includes a roller 286 that is retained within cam slot 282. Cam slot 282 is contoured to cause sliding movement of shift rail 272 in a first direction (i.e., to the right in FIG. 7) for moving shift member 270 from its AUTO mode position into its LOCK mode position in response to rotary movement of cam plate 280 in a first direction. In contrast, rotation of cam plate 280 in the opposite second direction causes cam slot 282 to slide shift rail 272 in a second direction (i.e., to the left in FIG. 7) for moving shift member 270 from its LOCK mode position into its AUTO mode position. As will be understood, movement of shift member 270 to its AUTO mode position results in movement of actuator block 200 to its first position for shifting PTU 16A into its on-demand four-wheel drive mode. Likewise, movement of shift member 270 to its LOCK mode positions results in movement of actuator block 200 to its second position for shifting PTU 16A into its locked four-wheel drive mode.

Figure 8:
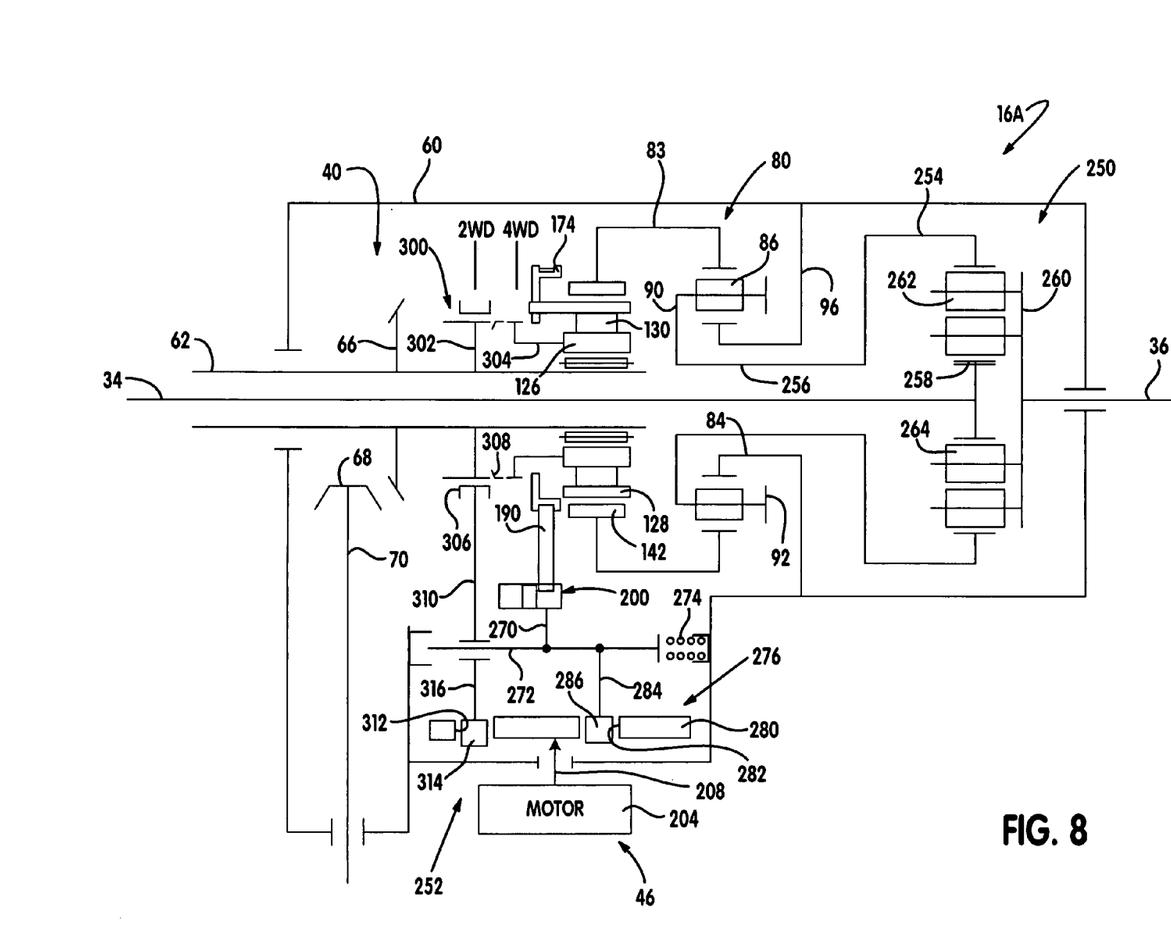

Referring to FIG. 8, PTU 16A has been modified to now also include a disconnect clutch 300 which can be selectively actuated by mode shift mechanism 252 to establish a two-wheel drive mode in addition to the already available on-demand and locked four-wheel drive modes. As will be detailed, disconnect clutch 300 is operable to selectively couple first ring 126 of mode clutch assembly 124 for rotation with input shaft 62. Disconnect clutch 300 is operable in a released mode to establish the two-wheel drive mode wherein mode clutch assembly 124 is uncoupled from input shaft 62 such that all drive torque is delivered to rear driveline 18 via pinion shaft 70. In addition, disconnect clutch 300 is also operable in an engaged mode to couple mode clutch assembly 124 to input shaft 62 so as to permit it to selectively transmit drive torque to front driveline 20 via second drive mechanism 42 for establishing either of the on-demand or locked four-wheel drive modes.

Disconnect clutch assembly 300 includes a hub 302 fixed to input shaft 62, a clutch ring 304 fixed to first ring 126, a mode sleeve 306 splined for rotation on sliding movement relative to hub 302, and a synchronizer 308. As seen, first ring 126 is now rotatably supported by a bearing assembly on input shaft 62. Mode sleeve 306 is axially moveable between a two-wheel drive position (2WD) and a four-wheel drive position (4WD) via actuation of mode shift mechanism 252 under the control of power-operated actuator 46. Mode shift mechanism 252 now includes a mode fork 310 which is mounted for sliding movement on shift rail 272. In addition to cam slot 282, cam plate 280 now includes a second cam slot 312 with a second roller 314 retained therein. Second roller 314 is fixed to a second follower member 316 which, in turn, is fixed to mode fork 310. As such, rotation of cam plate 280 now also functions to control movement of mode fork 310 which, in turn, controls movement of mode sleeve 306 between its 2WD and 4WD mode positions. The profile of cam slots 282 and 312 permit coordinated movement of shift member 270 and mode fork 310 required to establish the available drive modes.

Mode select mechanism 48 permits selection of the two-wheel drive mode in addition to the on-demand and locked four-wheel drive modes previously disclosed. Upon selection of the two-wheel drive mode, controller 50 commands motor 204 to rotate cam plate 280 to a first position where shift member 270 is located in its LOCK position and mode sleeve 306 is located in its 2WD position. As is obvious, the contour and length of cam slot 282 would be slightly modified to accommodate this additional drive mode. With mode sleeve 306 in its 2WD position, it is released from engagement with clutch ring 304 such that first ring 126 of mode clutch assembly 124 is released from coupled engagement with input shaft 62.

When either of the four-wheel drive modes are thereafter selected, rotation of cam plate 280 causes mode sleeve 306 to move into its 4WD position whereat first ring 126 is coupled to input shaft 62 such that drive torque from mode clutch assembly 124 can be transmitted to front driveline 20. Specifically, selection of the locked four-wheel drive mode results in motor 204 rotating cam plate 280 to a position where mode sleeve 306 is located in its 4WD position and shift member 270 is located in its LOCK position. Similarly, selection of the on-demand four-wheel drive mode results in motor 204 rotating cam plate 280 to a position where mode sleeve 306 is located in its 4WD position while shift member 270 is located in its AUTO position. Again, the profiles of cam slots 282 and 312 facilitate such coordinated movement of shift member 270 and mode sleeve 306 in response to controlled rotary movement of cam plate 280. In addition, the use of disconnect clutch 300 permits instantaneous disengagement of mode clutch assembly 124 in response to controller 50 being alerted that a braking condition exists, thereby providing superior vehicle stability control.

Figure 9:
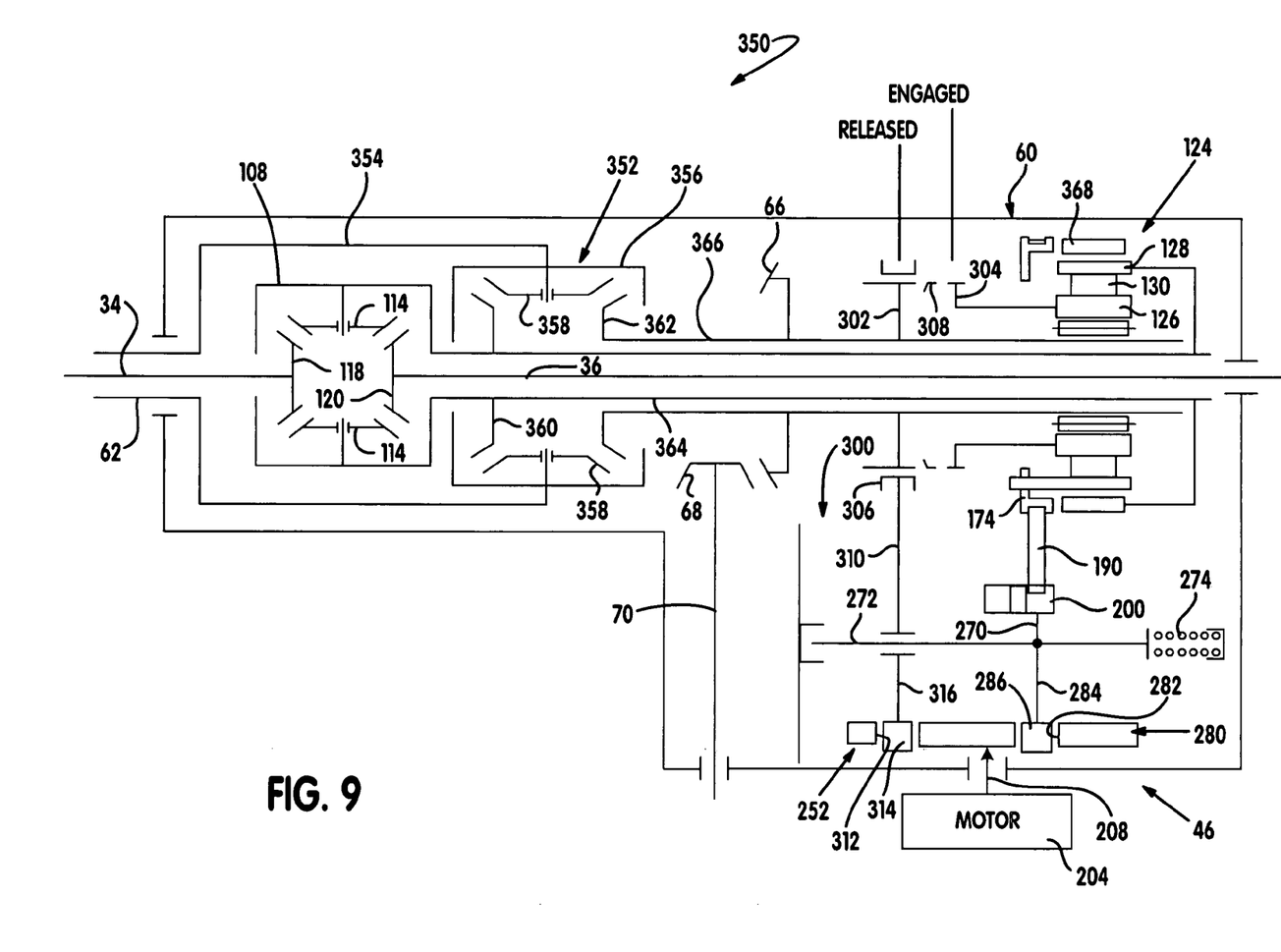

Referring now to FIG. 9, a power take-off unit (PTU) 350 is shown which is generally a full-time four-wheel drive version of on-demand PTU 16A shown in FIG. 8. However, PTU 350 includes a center differential 352 which operably interconnects input shaft 62 to front driveline 20 and rear driveline 18. In particular, input shaft 62 is connected via a transfer member 354 to a carrier 356 of center differential 352. Carrier 356 drives a pair of pinions 358 that are meshed with a first side gear 360 and a second side gear 362. A first transfer shaft 364 connects first side gear 360 to differential carrier 108 for driving front differential unit 82. Likewise, a second transfer shaft 366 connects second side gear 362 to hypoid ring gear 66 for driving pinion shaft 70. As seen, mode clutch assembly 124 is arranged to selectively couple first transfer shaft 364 to second transfer shaft 366 while disconnect clutch assembly 30 is arranged to selectively couple mode clutch assembly 124 to second transfer shaft 366. A drum 368 is shown fixed to first transfer shaft 366 and which is adapted to be frictionally clamped to slipper ring 128 upon locking of mode clutch assembly 124 for coupling first transfer shaft 364 to second transfer shaft 366 so as to lock center differential unit 352 and prevent interaxle speed differentiation.

PTU 350 is capable of operating in three distinct operational drive modes which include a full-time four-wheel drive mode, a locked four-wheel drive mode and an automatic all-wheel drive mode. When the full-time four-wheel drive mode is selected, controller 50 commands motor 204 to rotate cam plate 280 to a position wherein mode sleeve 306 is located in its RELEASED position and shift member 270 is located in its LOCK position. As such, mode clutch assembly 124 is uncoupled and all drive torque is transferred through center differential 352 to the front and rear drivelines with center differential 352 functioning as an open (i.e., unrestricted) differential. In contrast, selection of the locked four-wheel drive mode causes cam plate 280 to be rotated to a position where mode sleeve 306 is located in its ENGAGED position and shift member 270 is located in its LOCK position. Thus, mode clutch assembly 124 is connected to second transfer shaft 366 and is bi-directionally locked to prevent speed differentiation between transfer shafts 364 and 366. Accordingly, center differential 352 is locked in this drive mode.

Selection of the automatic all-wheel mode causes cam plate 280 to be rotated to a position where mode sleeve 306 is located in its ENGAGED position and shift member 270 is located in its AUTO position. As with the on-demand four-wheel drive mode previously described, this drive mode provides a one-way locking feature (in both the forward and reverse motive direction of the vehicle) to automatically lock mode clutch assembly 124 in response to certain interaxle speed differentiation events without any input from the vehicle operator. Such interaxle speed differentiation is inhibited by releaseably coupling transfer shafts 364 and 366, thereby instantaneously locking center differential 352. As before, once the lost traction condition has been eliminated via locking of mode clutch assembly 124, it self-releases to return to operation in its unlocked condition. This automatic all-wheel drive mode, however, permits speed differentiation during turns since its one-way locking feature permits such opposite direction overrunning without locking of mode clutch assembly 124.

Preferred embodiments of the invention have been disclosed to provide those skilled in the art an understanding of the best modes currently contemplated for the operation and construction of the power transfer system. The invention being thus described, it will be obvious that various modifications can be made without departing from the true spirit and scope of the invention, and all such modifications as would be considered by those skilled in the art are intended to be included within the scope of the following claims.

What is claimed is:

1. A power transfer assembly for use in a motor vehicle to transfer drive torque from a powertrain to first and second drivelines, comprising:
   an input shaft driven by the powertrain;
   a first drive mechanism having a first input driven by said input shaft and a first output connected to the first driveline;
   a second drive mechanism having a second input and a second output connected to the second driveline;
   a bi-directional overrunning mode clutch having a first member supported for rotation relative to said input shaft, a second member driving said second input, and a plurality of third members located between said first and second members, said mode clutch is operable in a first mode to permit relative rotation between said first and second members in a first direction and prevent relative rotation therebetween in a second direction, said mode clutch is further operable in a second mode to prevent relative rotation between said first and second members in both directions;

a disconnect clutch operable in a first mode to couple said first member of said mode clutch to said input shaft and in a second mode to release said first member from coupled engagement with said input shaft;

a shift mechanism for shifting said mode clutch between its first and second modes and said disconnect clutch between its first and second modes; and an actuator for controlling movement of said shift mechanism between a first position and a second position, said shift mechanism is operable in its first position to shift said mode clutch into its first mode and said disconnect clutch into its first mode, and said shift mechanism is operable in its second position to shift said mode clutch into second mode and said disconnect clutch into its second mode.

2. The power transfer assembly of claim 1 wherein said mode clutch includes a mode shift member that is moveable between first and second positions to establish said corresponding first and second modes, wherein said disconnect clutch includes a disconnect shift member that is moveable between first and second positions to establish said corresponding first and second modes, and wherein said shift mechanism is operable to coordinate movement of said mode shift member and said disconnect shift member such that movement of said shift mechanism to its first position causes movement of said mode shift member to its first position and movement of said disconnect shift member to its first position, and wherein movement of said shift mechanism to its second position causes movement of said mode shift member to its second position and movement of said disconnect shift member to its second position.

3. The power transfer assembly of claim 2 wherein said shift mechanism is a cam plate having first and second cam surfaces and which can be rotated between said first and second positions, said shift mechanism also comprising a mode shift device having a first follower engaging said first cam surface such that rotation of said cam plate controls movement of said mode shift member between its first and second positions, and a disconnect shift device having a second follower engaging said second cam surface such that rotation of said cam plate controls movement of said disconnect shift member between its first and second positions, wherein said actuator controls rotation of said cam plate between its first and second positions.

4. The power transfer assembly of claim 3 wherein said cam plate is further rotatable to a third position for causing said mode shift member to move to its second position and said disconnect shift member to move to its first position.

5. The power transfer assembly of claim 1 wherein said actuator is further operable to move said shift mechanism to a third position for causing said mode clutch to be shifted into its second mode and said disconnect clutch to be shifted into its first mode.

6. The power transfer assembly of claim 5 further comprising:
a mode selector for permitting selection of one of a two-wheel drive mode, an on-demand four-wheel drive mode, and a locked four-wheel drive mode; and
a control unit for receiving a mode signal from said mode selector and causing said actuator to move said shift mechanism to establish the selected drive mode, said shift mechanism is operable in its first position to establish said two-wheel drive mode, said shift mechanism is operable in its second position to establish said on-demand four-wheel drive mode, and in its third position to establish said locked four-wheel drive mode.

7. The power transfer assembly of claim 1 wherein said first drive mechanism includes a ring gear fixed to said input shaft and a pinion gear meshed with said ring gear that is fixed to a pinion shaft coupled to the first driveline, and wherein said second drive mechanism includes a differential interconnecting said second input to the second driveline.

8. The power transfer assembly of claim 7 wherein said second drive mechanism includes a reduction unit having a first gear fixed for rotation with said second member of said mode clutch, a fixed second gear, and a third gear meshed with said first and second gears, and wherein said third gear drives said differential.

9. A power transfer unit for transferring drive torque from a powertrain to front and rear drivelines comprising:
an input driven by the powertrain;
a first output for transmitting drive torque from said input to the rear driveline;
a second output connected to the front driveline;
a bidirectional overrunning mode clutch operably disposed between said input and said second output, said mode clutch is operable in an AUTO mode to permit relative rotation between said input and said second output in a first direction and prevent relative rotation therebetween in a second direction, and said mode clutch is operable in a LOCK mode to prevent relative rotation between said input and said second output in both directions;
a disconnect clutch operable in a 2WD mode to release said mode clutch from coupled engagement with said input and in a 4WD mode to couple said mode clutch to said input; and
a shift mechanism for shifting said mode clutch between its AUTO and LOCK modes and said disconnect clutch between its 2WD and 4WD modes.

10. The power transfer unit of claim 9 wherein said bidirectional overrunning mode clutch includes a first ring supported on said input, a second ring, and rollers in rolling engagement with cam surfaces of said first and second rings, said second ring is adapted to circumferentially index relative to said first ring to cause said rollers to engage said cam surfaces and frictionally couple said second ring to said second output, and wherein said disconnect clutch is operable in its 4WD mode to couple said first ring to said input.

11. The power transfer unit of claim 9 wherein said mode clutch includes a mode actuator that is moveable between first and second position to establish said AUTO and LOCK modes, wherein said disconnect clutch includes a disconnect actuator that is moveable between first and second positions to establish said 2WD and 4WD modes, and wherein said shift mechanism is operable to coordinate movement of said mode actuator and said disconnect actuator.

12. The power transfer unit of claim 10 wherein an on-demand four-wheel drive mode is established when said mode actuator is in its first position and said disconnect actuator is in its second position, wherein a part-time four-wheel drive mode is established when said mode actuator is in its second position and said disconnect actuator is in its second position, and wherein a two-wheel drive mode is established when said mode actuator is in its second position and said disconnect actuator is in its first position.

13. A motor vehicle comprising:
- a powertrain for generating drive torque;
- a primary driveline including a primary differential interconnecting a driveshaft to a pair of primary wheels;
- a secondary driveline having a pair of secondary wheels;
- a power transfer assembly having an input driven by said powertrain, a first drive mechanism connecting said input to said driveshaft, a second drive mechanism driving said secondary wheels, a bidirectional overrunning mode clutch operably disposed between said input and said second drive mechanism, said mode clutch is operable in an AUTO mode to permit relative rotation between said input and said second drive mechanism in a first direction and prevent relative rotation therebetween in a second direction, and said mode clutch is operable in a LOCK mode to prevent relative rotation between said input and said second drive mechanism in both directions, a disconnect clutch operable in a 2WD mode to release said mode clutch from coupled engagement with said input and in a 4WD mode to couple said mode clutch to said input; and
- a shift system for shifting said mode clutch between its AUTO and LOCK modes and said disconnect clutch between its 2WD and 4WD modes.

14. The motor vehicle of claim 13 wherein said mode clutch includes a mode actuator that is moveable between first and second position to establish said AUTO and LOCK modes, wherein said disconnect clutch includes a disconnect actuator that is moveable between first and second positions to establish said 2WD and 4WD modes, and wherein said shift mechanism is operable to coordinate movement of said mode actuator and said disconnect actuator.

15. The motor vehicle of claim 14 wherein an on-demand four-wheel drive mode is established when said mode actuator is in its first position and said disconnect actuator is in its second position, wherein a part-time four-wheel drive mode is established when said mode actuator is in its second position and said disconnect actuator is in its second position, and wherein a two-wheel drive mode is established when said mode actuator is in its second position and said disconnect actuator is in its first position.

16. The motor vehicle of claim 13 wherein said bidirectional overrunning mode clutch includes a first ring supported on said input, a second ring, and rollers in rolling engagement with cam surfaces of said first and second rings, said second ring is adapted to circumferentially index relative to said first ring to cause said rollers to engage said cam surfaces and frictionally couple said second ring to said second drive mechanism, and wherein said disconnect clutch is operable in its 4WD mode to couple said first ring to said input.

17. The motor vehicle of claim 16 wherein said second drive mechanism includes a reduction unit and a secondary differential, said reduction unit includes a first gear fixed for rotation with said second ring, a second gear fixed against rotation, and a third gear meshed with said first and second gears and supported from a carrier fixed to an input of said secondary differential, said secondary differential having a pair of outputs connected to said secondary wheels.

* * * * *